United States Patent

Gopfert

[15] 3,700,994
[45] Oct. 24, 1972

[54] MACHINE-CONTROL SYSTEM
[72] Inventor: Max Gopfert, Munich, Germany
[73] Assignee: Krauss-Maffei, Munich, Germany
[22] Filed: Aug. 26, 1970
[21] Appl. No.: 67,073

[30] Foreign Application Priority Data
Sept. 23, 1969 Germany..........P 19 48 047.8

[52] U.S. Cl..................................318/579, 318/663
[51] Int. Cl.............................................G05b 19/36
[58] Field of Search......................318/579, 637, 663

[56] References Cited

UNITED STATES PATENTS 2,875,389  2/1959  Morrill et al...........318/637 X
3,136,936  6/1964  Eisengrein................318/579

*Primary Examiner*—T. E. Lynch
*Attorney*—Karl F. Ross

[57] ABSTRACT

A machine-control system is disclosed wherein a potentiometer is connected to a moving machine part to produce a control signal which is compared with a reference voltage developed across a reference potentiometer to operate control circuitry through a comparator amplifier. The reference resistors are mounted on a replaceable plate interchangeable with other plates upon alteration of the machine program. Alternatively, or in addition, a programming plate may be provided for each program automatically to set a number of reference resistors or the program may be established by the use of switches associated with respective taps on the reference resistors.

1 Claim, 8 Drawing Figures

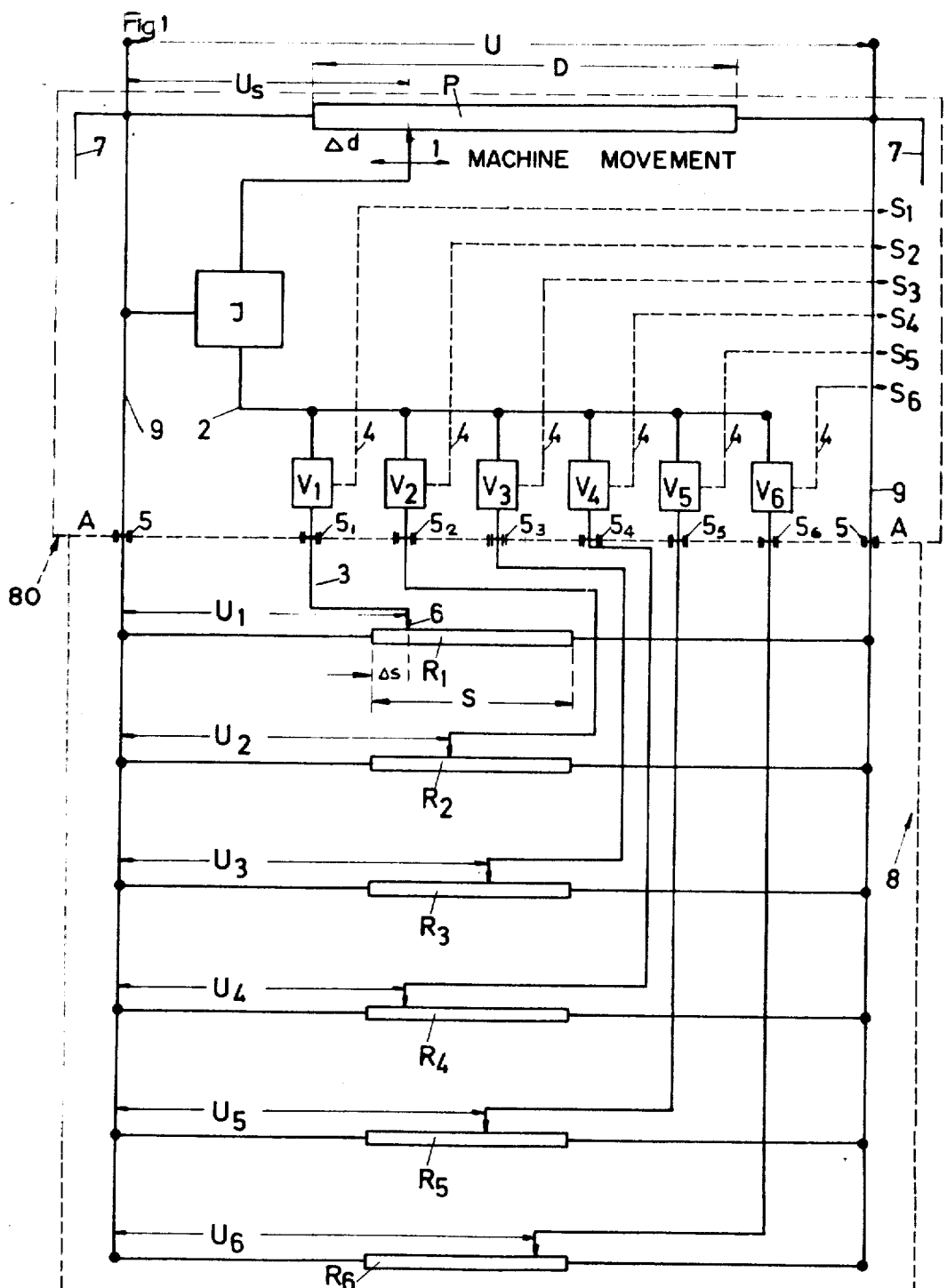

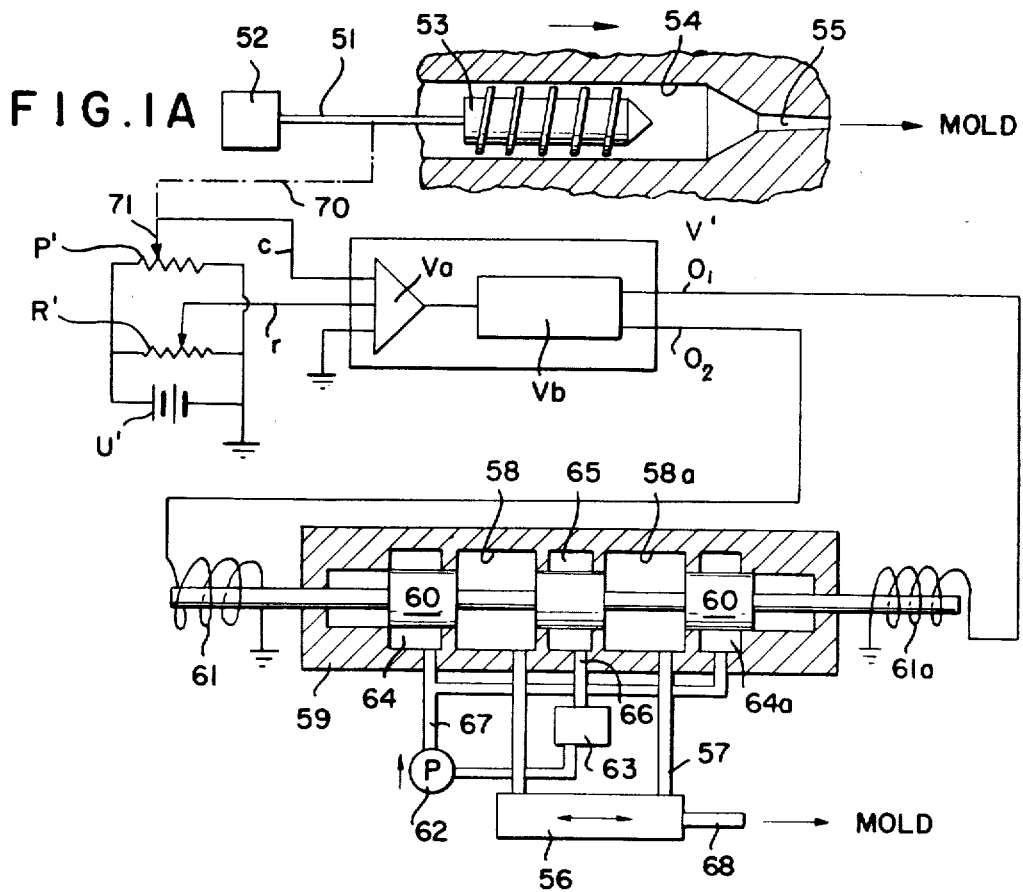
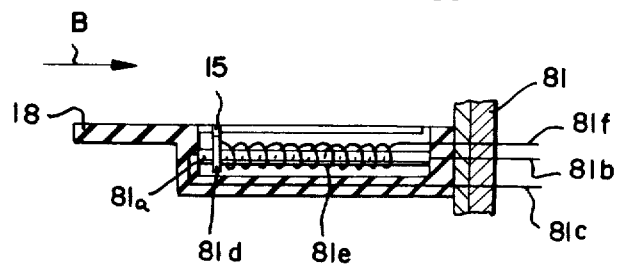
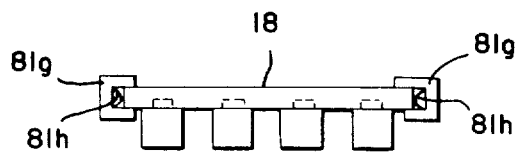

MACHINE-CONTROL SYSTEM

My present invention relates to machine-control systems and, more particularly, to programming circuits for machines having movable parts in which operations are controlled in accordance with the position of one of the movable parts.

Numerous automatic control systems have been provided for machines of various types. For example, in machine tools and other devices having longitudinally shiftable slides or rotating members, e.g. leadscrews, and in injection-molding machines in which the ram is longitudinally displaceable, it has become common practice to control sequencing operations from the position of the moving element.

In one configuration of an automatic control system for such purposes, the moving machine element operates switching devices at each of the critical locations to trigger, in turn, other machine operations. In the case of an injection-molding machine, for example, the advance of the injection-molding ram may be used to initiate mold-closing and like operations which must occur at intervals precisely associated with the position of the moving machine element. In addition or alternatively, similar circuits may be employed to terminate movement of a machine part at a precise location or to adjust the movement of the principal machine element or another machine element in accordance with the position of the former.

Analog-type servomechanisms have, moreover, been incorporated into machine-control systems and, in some cases, analog controls have been used to produce signals for initiating subsequent steps in a machine-operation program. It has been proposed, for instance, to couple the movable element of a potentiometer (variable resistor) to the moving machine element and to use the potentiometer as a voltage divider whose output voltage of which is proportional to the extent of movement of the machine element. A reference potentiometer is provided, also as a voltage divider, to yield a reference signal in the form of a voltage which is compared with the controlled voltage to generate, via an amplifier, an output serving to control a machine operation via an operating element such as an electromagnetically operable valve or the like. The control voltage derived across the potentiometer coupled with the machine element is in continuous comparison with the constant reference potentiometer and, upon identity of the two reference potentials, the output signal is generated by the comparator-amplifier.

This system has the important disadvantage that the reference resistor must establish the aforementioned constant potential for a particular machine operation and that machine operations for different machine programs may be commenced or terminated with the machine element in different positions. Hence, resetting of a variable reference resistor or replacement of the reference resistor was necessary to accommodate the circuit to the different programs. Such replacement or resetting requires skilled personnel and frequently involves substantial interruptions of production as a result of the downtime required for resetting the resistors or replacing them. It will be apparent that the problem is multiplied when numerous resistors are required as, for example, when numerous machine operations are controlled sequentially or in tandem from the moving machine element in the injection-molding art. Furthermore, replacement of the reference resistors is expensive and may give rise to failure in the control system as a consequence of human error or the use of unsatisfactory components.

It should be noted, further, that conventional machine-control systems are not generally equipped with satisfactory means for indicating values of operating parameters encountered during machine operation and critical thereto. For the most part, indicating means associated with machines such as injection-molding devices have been provided with temperature-sensing devices adapted to provide an individual output upon the attainment of a predetermined value of the parameter for control or recording purposes. Of particular importance in injection-molding systems, for example, is the temperature within the mold or in the cylinder containing the thermoplastic resin prior to or concurrently with the molding step. In earlier systems with automatic program control, it has not been possible in any satisfactory manner to adjust the temperature-responsive means upon alteration of the program. In general, therefore, the means for altering the parameter response of a machine, for changed programs, has been as unsatisfactory as the means for altering the programs themselves.

It is, therefore, the principal object of the present invention to provide an improved machine-control system in which program change and/or parameter response can be altered conveniently, efficiently and with a minimum of skilled labor.

Another object of this invention is to provide an improved automatic control system for machines having a moving element in accordance with which a program sequence or other machine operations are to be regulated and which facilitates alteration of the response to the movement of the machine element.

A further object of my invention is to provide an improved control system for a machine, capable of operating in accordance with a number of programs, in which parameter response may be altered conveniently upon switchover from one program to another.

It is also an object of my invention to provide a single, readily altered and convenient programming arrangement for the operational sequence of an injection-molding machine in response to the displacement of the ram thereof.

Also, it is an object of the invention to provide an improved temperature-control system for an injection-molding or like machine.

These objects, and others which will become apparent hereinafter, are attained, in accordance with the present invention, in an automatic control system or program arrangement for a machine, preferably a machine having a longitudinal slide, cross slide, tool-control carriage, ram, plunger or other moving machine element, in which an electrical variable impedance is provided to generate an output representing a parameter of the machine operation in the form of a continuous analog electrical signal. According to the invention, a reference impedance of like character is provided to generate a constant electrical signal (reference signal), the control signal and the reference signal being supplied to a comparator having an output upon equality of the reference and control signals which is delivered to an operating element adapted to respond to the attainment of the predetermined value of the parameter represented by the reference signal. In accordance with the present invention, means are provided for automatically varying the value of the reference impedance connected to the comparator impedance upon change in the program of the machine.

More specifically, and according to one aspect of the invention, the parameter-responsive impedance is a variable resistor bridged across a power supply and serving as a voltage divider whose wiper is shifted in accordance with the displacement of the moving machine element (i.e. the ram in an injection-molding machine) to produce a control signal in the form of a voltage representing the extent of displacement or position of the moving machine element. The reference impedance is constituted, therefore, as a set of reference resistors, each of which likewise may be connected to a power supply and has a characteristic output establishing desired parameter values at which the subsequent machine operations are to be initiated or terminated. The output of the potentiometer is therefore connected to a number of comparator amplifier units, each of which receives a reference input from a respective resistor. As each of the comparator amplifiers receives a control voltage from the potentiometer equal to the corresponding reference voltage, it generates an output which is transmitted to a conventional operating element, e.g. an electromagnetic valve, to control a subsequent operation (e.g. closing of the mold of the injection-molding machine).

According to a more specific feature of this invention, the reference resistors are mounted upon a common support which is provided with suitable connectors for joining each of the reference resistors in the respective circuit and which may be removed as a unit from the control circuit and replaced by a similar board, panel or support provided with reference resistors having values different from the first but adapted to be substituted therefor to establish the altered sequence in response to the position of the moving machine element. It will be apparent that a number of such boards, each carrying an appropriate number of resistors of the desired values, can be provided and stored and that the appropriate board may simply be inserted upon removal of the previously used board whenever a program change is desired. Consequently, individual handling of the resistors is avoided, there is no need for skilled personnel to alter the values of the reference resistors, and human error in establishing a revised program can be eliminated.

According to another feature of this aspect of the invention, whether or not a removable board is provided to carry the reference resistors, the reference resistors may be tapped and provided each with a bank of switches designed to select an appropriate tap and apply the corresponding reference voltage to the comparator amplifier. Each switch of a particular bank hence represents a specific fractional value of the total potential across the reference resistor which here constitutes a voltage divider as described above. Again control of the reference-resistor settings is possible merely by operating the switches and requires no skilled personnel or replacement of components.

In accordance with a further feature of this aspect of the invention, the reference resistors are fixed in the control section of the apparatus and are designed as variable resistors having control elements engageable by a programming plate or template inserted into the resistor section to set the various reference resistors to the required value. In this case, only one array of resistors is necessary and the resistors may be permanently mounted in the machine. To vary the program, it is merely necessary to replace one programming plate with another, the programming plates having varying contours in accordance with the degree of displacement necessitated for each of the operating elements of the reference potentiometers. Advantageously, the reference potentiometers are constituted as slider potentiometers and extend parallel to one another in a generally planar array with their respective operating elements codirectional so as to be engageable in grooves or slots of the programming plate, the grooves or slots having varying length in accordance with the degree of displacement of the operating elements of the reference potentiometers.

According to another aspect of this invention, the above-described principles are employed to measure and/or control a particular operating parameter of a machine, e.g. an injection-molding apparatus, or to control further machine operations and/or initiate corrective action concerning the parameter. More specifically, the invention is applicable to the temperature control of injection-molding and other machines for the processing of thermoplastic resins.

According to this aspect of the invention, the control system comprises parameter-responsive electrical-impedance means, i.e. a transducer responsive to the parameter to be measured and variable to produce an electrical output representing the magnitude of this parameter. The analog-type control element is equivalent to a potentiometer, and may be resistive, inductive, or capacitive in nature. The control element can, consequently, be a thermistor (i.e. a temperature-responsive resistor), a thermally sensitive capacitor whose inductance is a function of temperature or a thermally responsive inductor whose inductance is a function of temperature, or some other temperature-sensitive device operating upon a variable resistor, inductor or capacitor. For example, the parameter-responsive element may be an optical device (e.g. an optical pyrometer) or even electromagnetic means responsive to temperature. This aspect of the invention provides that the control signal, derived from the impedance which responds to change in the parameter, is fed to a comparator/amplifier which, in turn, receives a reference signal from a reference impedance, preferably of a similar nature. The control device makes use of a servomotor, preferably via a friction clutch, for driving a setting member which, in turn, produces the instantaneous or control signal (e.g. via a potentiometer) whose deviations from the desired value are used, in accordance with the desired response, to produce a control signal for regulating the parameter.

The control element is connected via a bridge circuit with the reference resistance so that, upon attainment of the nominal or desired value, the bridge is balanced. The setting member permits a potential difference to develop across the bridge which constitutes an error signal and is fed through a feed-back path to the servomotor to control the parameter. The reference resistors are mounted, in the manner previously described for a potentiometer, in accordance with the desired levels of the various parameters to be controlled. Here again, skilled labor is not required to alter the response of the machine to a particular parameter upon change of the program.

The above and other objects, features and advantages of the present invention will become more readily apparent from the following description, reference being made to the accompanying drawing in which:

FIG. 1 is a circuit diagram partially in block form and diagrammatically representing mechanical structure of a control system for a machine in accordance with the present invention;

FIG. 1A is a further diagram representing the detail of a portion of the system of FIG. 1, showing association of several of the parts with various portions of the control systems of the machine;

FIG. 3A is a cross-sectional view through one of the resistors taken transversely to the plate;

FIG. 3B is an end view showing the plate in place;

Figure 2:
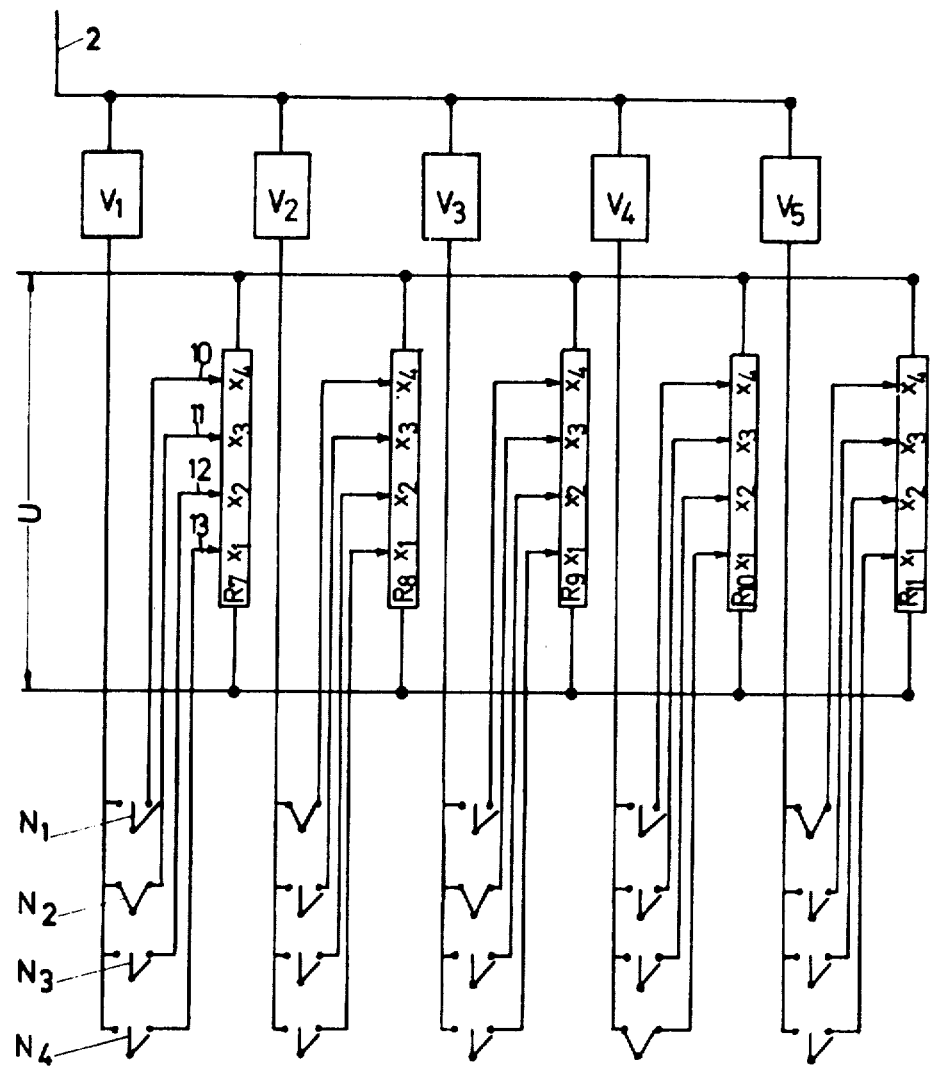
FIG. 2 is a diagram illustrating another embodiment of the invention.

The system of the present invention will be described hereinbelow with reference to an injection-molding machine for thermoplastic synthetic resins, parts of which are illustrated in FIG. 1A; it should be understood that the sequencing is controlled by the stroke of the injection-molding piston, plunger or ram. The other machine elements, including the means for opening and closing the molds and establishing their order of operation, are activated at specified points of advance of the ram. These operations also include the ejection of the injection-molded article and the charging of the cylinder with the synthetic resin which is displaced by the ram into the mold. These operations are, of course, independent of one another except to the extent that they must follow one another in succession with a timing as determined by the position of the ram. One such control arrangement has been illustrated diagrammatically in FIG. 1A in which the ram is represented at 51 and may be considered to be fixed to hydraulic or motor means 52. The ram includes a plasticizing screw 53 which is reciprocable in the cylinder 54, the latter being filled with a thermoplastic synthetic resin in a predetermined quantity by means not shown. The outlet 55 of the cylinder is, of course, connected with the mold.

The mold may be opened and closed by means of a double-acting cylinder 56 connected by conduits 57 to a pair of chambers 58 and 58a of a control valve 59. The latter is an electromagnetic spool valve whose spools 60 can be shifted to the left and to the right, respectively, by energization of electromagnetic coils 61 and 61a. A pump 62 supplies hydraulic fluid from a reservoir 63 to chambers 64 and 64a of the valve while a further chamber 65 is connected via a return line 66 with the reservoir 63. Upon displacement of the spools 60 to the left, hydraulic fluid is forced via a line 67 and chamber 64 into chamber 58 and thence to the left-hand portion of cylinder 56 while the right-hand portion of the cylinder returns hydraulic fluid through chambers 58a and 65 to the reservoir 63. The piston 68 of the cylinder 56 is shifted to the right to close the mold. When the electromagnetic coil 61a is energized, however, the spools 60 are drawn to the right, thereby permitting fluid to flow under pressure from chamber 64a into chamber 58a and, consequently, into the right-hand side of cylinder 56. The left-hand side of this cylinder is connected to the reservoir 63. As a result, the piston 68 is drawn to the left and the mold is opened. A similar control device may be used to operate hydraulic means for ejecting the molded article and for feeding a metered amount of the thermoplastic into the cylinder 54.

Each of the operations is controlled by the ram 51 which is shown to be linked at 70 with the wiper 71 of a control potentiometer P'. For the control operation diagrammed in FIG. 1A, the control potentiometer P' is connected in a bridge circuit with a reference potentiometer R' across an electric current supply U', the output of the bridge being taken across the wipers of resistors P' and R', and being applied as inputs to a comparator/amplifier arrangement V'. As illustrated in the drawing, the comparator/amplifier comprises an amplifier stage $V_a$ determining the equality of the reference signal applied as an input $r$ with the control signal applied as an input $c$. The output of the amplifier $V_a$ is applied to a bistable circuit $V_b$, e.g. a Schmitt trigger, which normally has an output $O_1$ applied to the coil 61a and designed to maintain the mold open.

When, however, the output of the amplifier $V_a$ is nullified by equality of the two input signals, an output $O_2$ is generated to energize coil 61 while output $O_1$ is terminated. The mold is then closed as indicated earlier. In the subsequent discussion the comparator/amplifier may be described as having a single output to the controlled member, it being understood that this too is possible where the controlled member is normally biased into one position and is only intermittently triggered into its other state. It should also be understood that operating elements of various forms may be used in accordance with the present invention, although electromagnetic and hydraulic means have been illustrated. For example, the output may control an electrical servomotor which directly drives the member to be actuated or may produce a signal which, in turn, acts via electronic circuitry (electronic switches, relays and the like) for operating their controlled members.

While FIG. 1A illustrates a detail of the invention, the overall nature of the control system can best be seen from FIG. 1. From FIG. 1 it will be apparent that the wiper 1 is shifted along the control potentiometer P in accordance with the machine movement (translation), the potentiometer P being connected across a voltage source U so that, in accordance with the position of the wiper 1, a variable voltage $U_s$ is generated between the wiper and one terminal of the source U. Assuming, therefore, that the wiper 1 has been shifted through a distance constituting the fraction $(\Delta d)/D$ of the length of the impedance P, the control signal $U_s$ may be defined as $U_s = \Delta d/D \cdot U$. As $\Delta d$ increases, therefore, with translation of the machine element to the right, the signal $U_s$ will correspondingly increase.

The signal $U_s$ is applied as an input to an impedance transformer I whose output constitutes one input 2 (control signal) fed in parallel to a number of comparator amplifiers $V_1 - V_6$, each of which has an output 4 connected to an operating element $S_1 - S_6$ associated therewith in the manner described and illustrated with respect to FIG. 1A. The reference inputs to each of the amplifiers $V_1 - V_6$ are represented at 3.

It will be appreciated that the number of comparator/amplifiers $V_1 - V_6$ corresponds to the number of subsequent operations to be controlled, triggered or terminated by the system, each operation being in turn represented at $S_1 - S_6$. For each of these operation, moreover, there is provided a respective reference resistor $R_1 - R_6$ which is connected across the source U and can be adjusted by a wiper 6 to have potentials $U_1 - U_6$. The potentiometers $U_1 - U_6$ are, of course, constant since the source potential U is fixed and the wipers 6 of the reference resistors are fixed once they have been set to provide the desired reference voltage level for triggering the corresponding operation. In the system illustrated in the drawing, the wiper of reference resistor $R_4$ is shown to be positioned at a point corresponding to the location of the wiper of resistor $R_1$. Under these circumstances, the potential $U_4$ will equal the potential $U_1$ and operation $S_1$ will commence simultaneously with operation $S_4$. The fixed setting of resistor $R_1$ represents the fractional part $(\Delta s)/S$ of the entire resistance R. Where U is the potential applied across each of the resistors $R_1 - R_6$, the output potential $U_1$, for example, is given as $U_1 = (\Delta s/S) \cdot U$. When $U_1 = U_s$, the comparator amplifier $V_1$ provides the necessary output. Similarly, when $U_s = U_2, U_3, U_4, U_5$ or $U_6$, the corresponding operating elements $S_2 - S_6$ are triggered. To simplify the illustration, each of the comparator/amplifiers $V_1 - V_6$ is shown to have only a single signal output 4. More generally, two outputs will be provided, e.g. from a bistable device as described in connection with FIG. 1A, one of which becomes effective upon the attainment of signal equality to initiate or terminate an operating state.

The reference or comparison resistors $R_1 - R_6$ are each characteristic of the desired operation sequence for only a single injection-molding operation or configuration. When it is desired to mold other shapes, the sequencing will, of course, differ and the individual machine operations must commence or terminate at other locations of the injection ramp. Consequently, the levels for constant signals $U_1 - U_6$ of the resistors $R_1 - R_6$ must be altered to accommodate the new program.

According to an important feature of this invention, the resistors $R_1 - R_6$ are mounted upon a common support, carrier or terminal part 8 diagrammatically shown at 8, the part being separable along the line A—A from the upper part of the control system which remains fixed in the machine housing. Along separating line A—A, the part 8 and the upper housing portion 80 are provided with mutually engaging contacts 5, preferably of the block type, and contacts $5_1 - 5_6$ each serving to connect one of the output leads 3 of voltage sources $R_1 - R_6$ with the input to the respective comparator/amplifier $V_1 - V_6$. The contacts 5 connect the leads 9 from the current source U across the resistors $R_1 - R_6$. The removal of plate 8 and its replacement by another plate having resistor set at different values permits a different program to be carried out. As a result, unskilled personnel can perform the program change in short order and without machine standstill.

In FIG. 2, I have shown a modified programming system in accordance with the invention, the camparator amplifiers $V_1 - V_5$ receiving the control inputs via the lead 2 as previously described and having outputs (not shown) to the respective operating elements. In this embodiment, however, the reference resistors $R_7 - R_{11}$ are shown to be tapped at locations $X_1 - X_4$ with taps indicated at 10 – 13. The reference resistors $R_7 - R_{11}$ are, permanently connected or associated with the respective comparator/amplifiers $V_1 - V_5$. It should be understood that a block connection of the type illustrated in FIG. 1 can also be used.

Each of the taps 10 – 13 is connected in series with a respective switch $N_1 - N_4$, the switches associated with the taps of each reference resistor forming a bank and being accessible on the control panel of the machine and, possibly, at a location remote from the control circuit. The switches are here shown to be single-pole, single-throw toggle pushbutton switches and to be independently actuatable, although mechanical means can be provided to insure that only one switch of each bank can be thrown at any time. The taps 10 – 13 deliver constant voltages represented at $X_1 - X_4$ which increase stepwise and may be selectively applied as the reference signals to the comparator/amplifiers. When, for example, the switch $N_2$ of resistor $R_7$ is closed, as illustrated, the switches $N_1$, $N_3$ and $N_4$ remain open and the potential derived at $X_3$ is applied to the comparator/amplifier $V_1$. For the reference resistor $R_8$, switch $N_1$ is closed to apply the reference voltage $X_4$ to the comparator/amplifier $V_2$. Similar switch closures in the bank of resistors $R_9 - R_{11}$ apply corresponding signals to their respective comparator/amplifiers. By simply changing the switch configuration, it is possible to substitute an alternate program for a program originally established, the system otherwise operating in the manner previously described.

Figure 3:
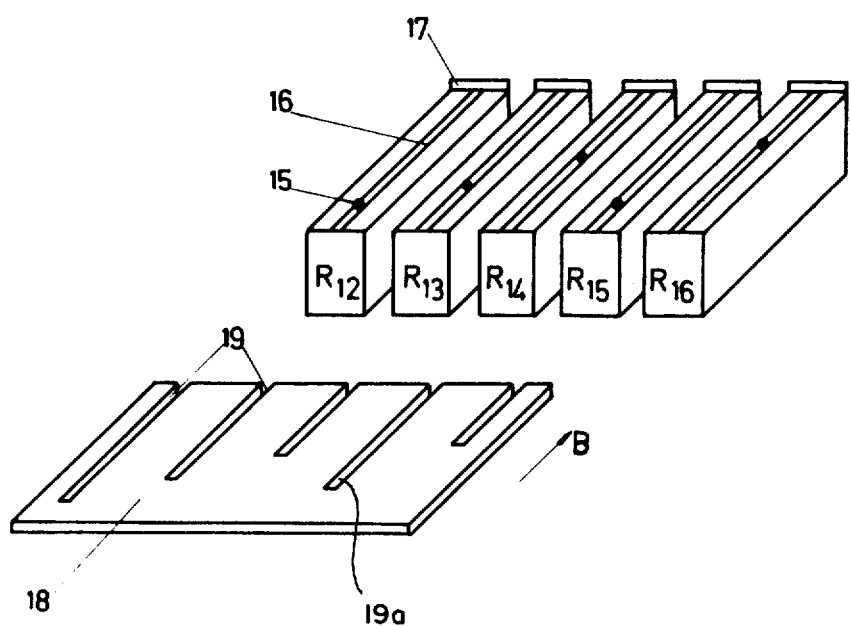
FIG. 3 is a perspective view of a control system wherein programming plates are employed to set fixed resistors, according to the invention.

FIGS. 3A and 3B represent still another embodiment of the invention wherein the reference resistors are permanently mounted in the control section of the machine although they may here as well be formed upon a removable or replaceable plate. The resistors $R_{12} - R_{16}$ may be electrically connected in the manner illustrated in FIG. 1. These resistors, i.e. longitudinally extending slider-controlled potentiometers, are mounted upon a console or support 81 in a planar array (FIG. 3). As illustrated in FIG. 3A, the resistors may comprise a wire-wound or carbon bar 81a connected at one end by a lead 81b to one terminal of the voltage source U and by a lead 81c to the other terminal of this source. A slider 81d engages the rod 81a and is connected electrically via a helical coil spring 81e and a lead 81f to the input of the comparator/amplifier as previously described. The slider 81d is formed with a projection 15 extending upwardly through a slot 16 extending longitudinally of the resistor. A programming plate 18 is provided with slots 19 of varying length to receive the projections 15 and shift them to the right (FIGS. 3 and 3A) when these projections engage the roots 19a of the respective slots. To prevent transverse dislocation of the programming plates 18, the latter may be inserted between a pair of guides 81g and 81h having confronting slots coplanar with the plate 18 and slidably receiving the latter (FIG. 3b). The guides 81g and 81h are provided with inwardly deflectable leaf springs 81h to frictionally resist withdrawal of the plate. Since the output of each reference resistor depends upon the extent to which the slider 15 has been displaced by the plate 18 when the latter is inserted in direction of arrow B, insertion of the plates establishes the desired program. Plates may be provided with slots to any desired depth in accordance with programming requirements.

When a large number of amplifiers are employed, e.g. more than 10, it has been found to be advantageous to introduce between the wiper 1 and the individual amplifiers an impedance transformer I to prevent objectionable signal variation at the input of one or more of the amplifiers. When the potentiometer P has a resistance of less than or equal to about 5 ohms (i.e. has a low ohmic value) it has been found to be advantageous to apply the external voltage at 7 from a higher-line-current source.

Figure 4:
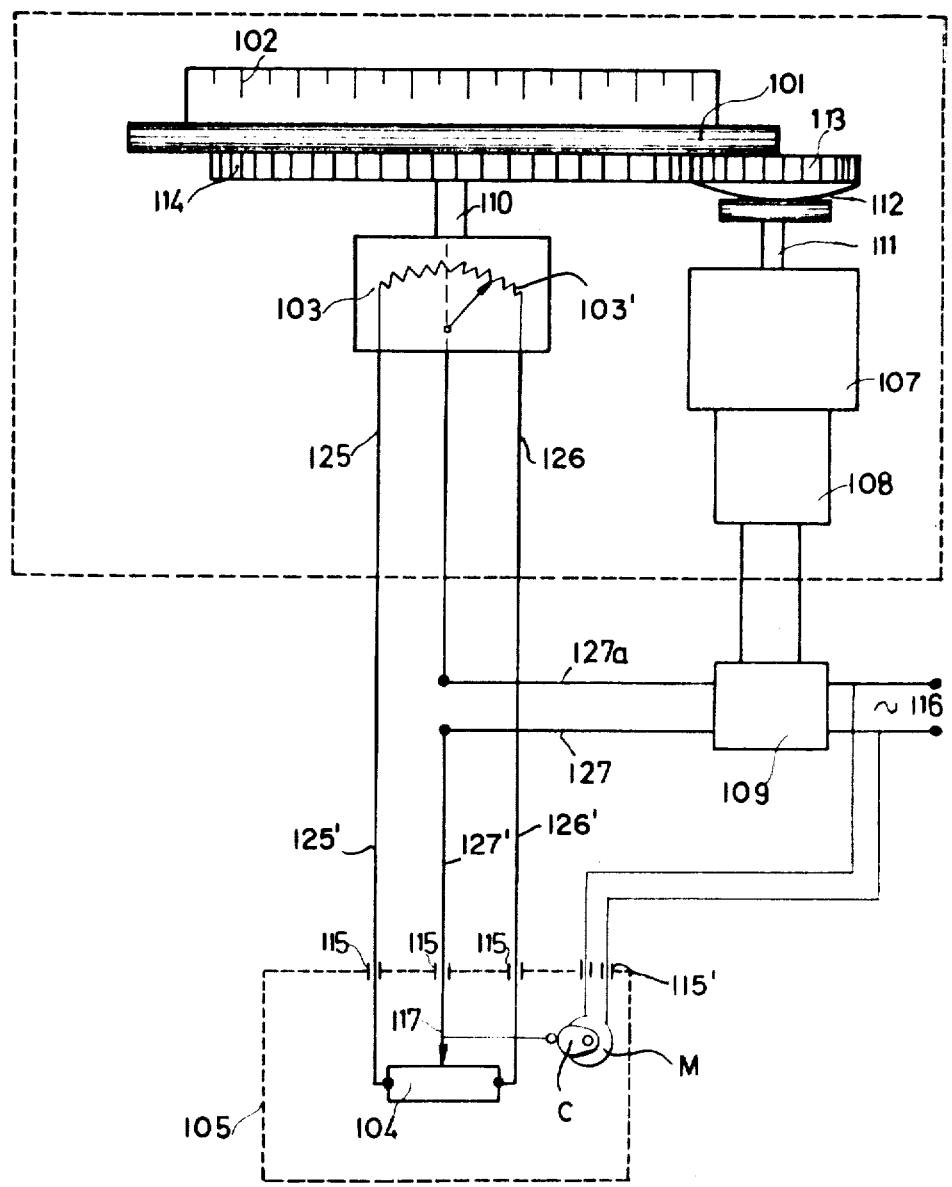
FIG. 4 is a circuit diagram of a parameter-control system embodying the invention.
Figure 5:
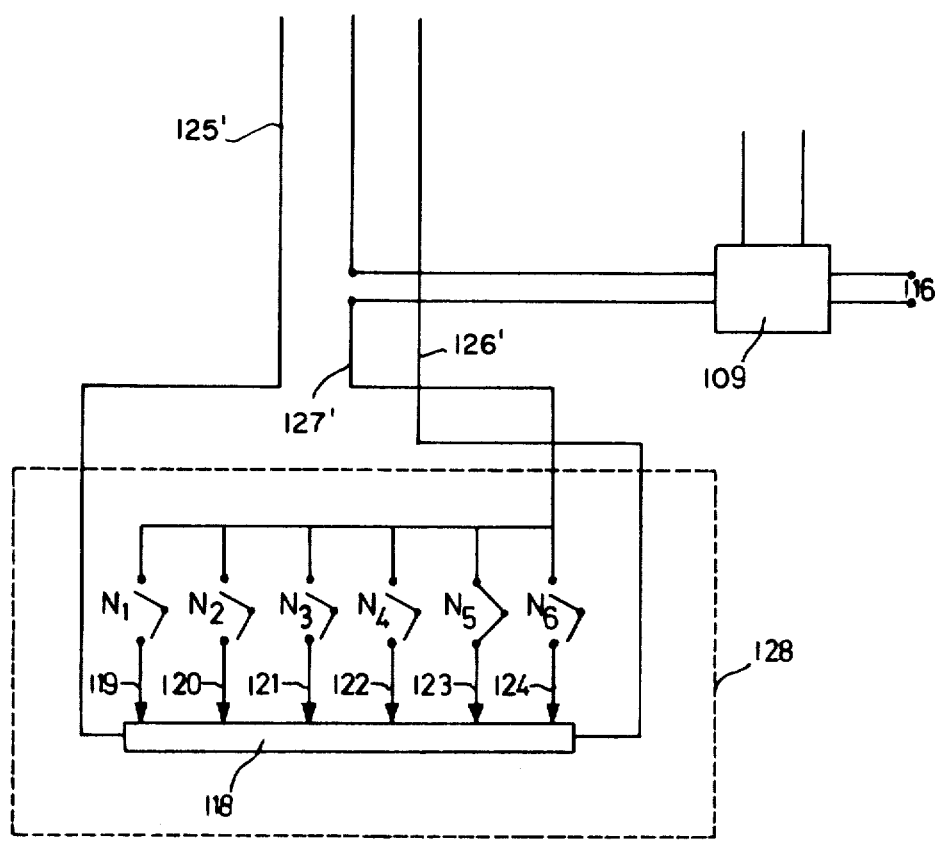
FIG. 5 is a detail view of a modification of the system of FIG. 4.

In FIGS. 4 and 5, I show the invention as applied to a temperature-measuring and temperature-control arrangement for a synthetic-resin molding machine or the like. According to this aspect of the invention, a disk 101 carries a temperature scale 102, both forming an adjusting body. The adjusting body 101, 102 is connected at its underside with a shaft 110 and is further provided with a gear 114 rigid with the shaft and the adjusting body. The shaft 110 is connected with a potentiometer 103 having leads 125 and 126 electrically coupled with the end points of a resistance element and a further lead 127a connected with the wiper of the potentiometer.

The gear 114 meshes with a pinion 113 which, in turn, is coupled by a friction clutch (slipping clutch) 112 to a shaft 111. Shaft 111 forms an output element of a gear transmission 107 (reducing gear) driven by a servomotor 108.

The resistance element of the potentiometer 103 is represented diagrammatically at 103' and is connected in a bridge circuit with reference resistance 104, shown to be a variable resistor having a wiper 117. As described in connection with FIGS. 1 – 3, a voltage source may be connected across the resulting bridge. The resistor 104 is mounted upon a program board 105 which may be identical with the program board 8 described in connection with FIG. 1 and may be removed from the control portion of the machine and replaced with a program board carrying another reference resistor. Alternatively, the resistor 104 may be fixed in the programmer housing and may be of the type illustrated in FIG. 3 with programming adjustment being carried out by insertion of a slotted template. In any event, the resistor for control of the temperature and, in general, resistors used to set the desired value of any other measured parameter will constitute part of the same arrangement as the resistors determining the sequence of the several operations. The board 105 supporting the resistors is shown to be provided with plug-and-jack connectors 115 to permit the programming plate carrying the resistors to be mounted in the programmer housing or upon the programmer console. Analogous to the leads 125 and 126 are the leads 125' and 126' connecting the extremities of the resistors 103' and 104 together. A lead 127' is connected to the wiper 117. The plug-and-jack connectors 115, therefore, are provided along the conductors 125', 126' and 127'.

A lead 127 further connects the wiper 117, representing one of the vertices of the bridge diagonal, as an input to a comparator/amplifier 109, the latter serving as a servomotor amplifier as well. The other input to this amplifier is derived via a lead 127a from the wiper of potentiometer resistor 103'. The amplifier 109 may be constituted as described on pages 258 ff of Servomechanism Practice, McGraw-Hill Book Co., New York 1960.

The servomotor 108 and transmission 107 can be of the type described at page 280ff thereof. The a-c input to the amplifier 109 is represented at 116.

The size of the reference resistor 104 is so selected that at the desired reading of scale 102, corresponding to the nominal or desired temperature value, the bridge is balanced. When the temperature deviates from the nominal value, i.e. the disk 101 rotates in response to an actual temperature value which differs from the desired value, the rotation of the disk is communicated to the potentiometer 103, 103' by shaft 110 and imbalance occurs in the bridge to produce a signal across the leads 127, 127a. The amplifier 109 responds as a comparator to this potential and energizes the servomotor 108 in a sense tending to drive shaft 111 and gear 113 in a corrective manner. Gear 114 is rotated until no further imbalance of the bridge exists. The original temperature value is thus reestablished upon scale 102. The amplifier 109 is provided to reinforce the control signals developed across the bridge where these signals are insufficient to power the motor 8. The reference resistor 104 defines the predetermined temperature value (nominal value) and can be easily plugged into or removed from the board 105 via the connectors 115. When it is desired to establish at the scale 102 another temperature value, it is merely necessary to provide a replacement resistor 104 or use the technique described in connection with FIG. 3 for adjusting the potentiometer. In an instance subsequent to such replacement, imbalance develops across the bridge to adjust the temperature level. Disk 1 is, of course, connected by any conventional means with the heating control (e.g. heater and thermostat) of the machine.

As shown in FIG. 5, it is possible to use the technique described in connection with FIG. 2 for the system of FIG. 4 as well. In this arrangement, toggle switches $N_1 - N_6$ are provided in series with respective taps 119, 120, 121, 122, 123 and 124 of a resistor 118 whose extremities are connected in a bridge circuit with the potentiometer 103 via the leads 125' and 126' as previously described. In this embodiment, however, the reference resistor does not possess a wiper but has its bridge-diagonal lead 127' connected in parallel to the switches $N_1 - N_6$. The programmed unit 128 carrying the resistor 118 may be plugged into circuit or may be fixed relative thereto. If the taps 119 – 124, represent a particular temperature value on the scale 102, then six temperature steps are provided. When one of the switches is closed, e.g. the switch $N_5$, a particular temperature is selected and, if this temperature deviates from the temperature simultaneously indicated on the scale 102, a potential develops across the bridge and is applied through amplifier 109 to the servomotor as previously described. The servomotor readjusts the disk 101 and the scale reading until balance of the bridge is restored and the temperature board shown on the scale equals the value $N_5$. When a larger number of temperature values are desired, the number of switches and tapped resistors may be increased as described in connection with FIG. 2 or the program board 128 can be replaced. In all cases, the disk 101 is a temperature-adjusting member forming part of a thermostat in accordance with conventional practice.

I have also found it to be advantageous to provide a motor or like arrangement M (FIG. 4) having a cam C for stepping the magnitude of the reference signal of the resistor 104 periodically in accordance with a predetermined program as may be required for the operation of a molding machine or the like. Such an arrangement is shown diagrammatically in FIG. 4 where the motor M is mounted upon the board 105 and may be energized by connectors 115' from the supply line 116. A similar motor and stepping-switch arrangement can be used for the switches $N_1 - N_6$ of FIG. 5.

The improvement described and illustrated is believed to admit of many modifications within the ability of persons skilled in the art, all such modifications being considered within the spirit and scope of the invention except as limited by the appended claims.

I claim:

1. A control system for actuating a plurality of controlled elements upon attainment of selected values by at least one controlling parameter, comprising:

voltage-generating means with a variable output responsive to said controlling parameter;

a source of fixed voltage;

a plurality of potentiometers connected across said source, each of said potentiometers having a slider delivering a respective reference voltage;

a plurality of voltage comparators, one for each potentiometer, each having a first input connected to said voltage-generating means for receiving said variable output nad having a second input connected to the slider of the associated potentiometer for receiving the corresponding reference voltage;

operating circuits for said controlled elements each connected to a respective voltage comparator for energization thereby upon equality of said variable output and the reference voltage at the inputs thereof;

common mounting means for holding said potentiometers as a bank in a fixed array with their sliders displaceable along parallel paths, said mounting means being provided with contacts for removably connecting said potentiometer to said circuits, respective springs biasing each of said sliders in one direction, and projections on said wipers extending codirectionally from said potentiometer sliders beyond a surface of the potentiometers ; and a common template for said potentiometers receivable by said mounting means and engageable with said sliders for jointly displacing them to selected positions , said mounting means being provided with guide means for said template along said surface and with abutment means for arresting said template in engagement with said guide means, said sliders having projections receivable in said slots.

* * * * *